Oct. 4, 1927.
J. RADOLSKY
1,644,353
SAFETY BOILING VESSEL
Filed Feb. 23, 1927
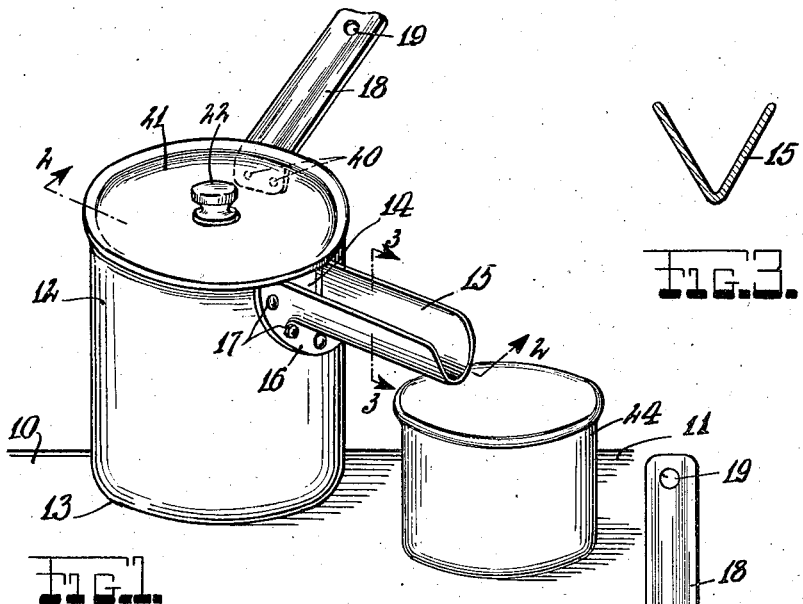
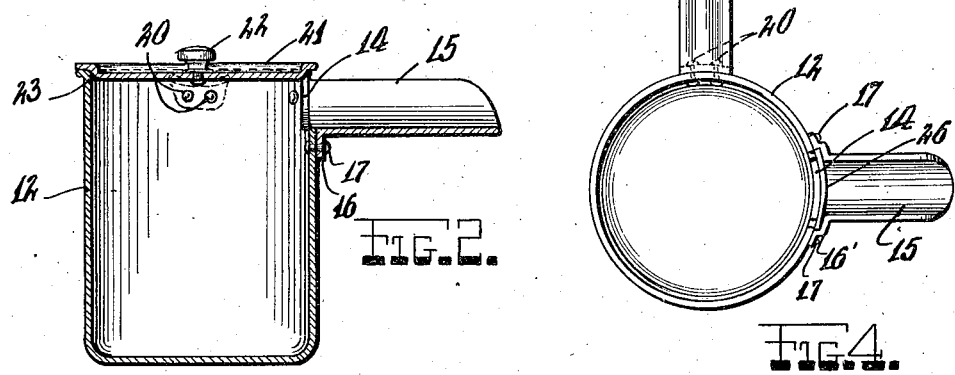
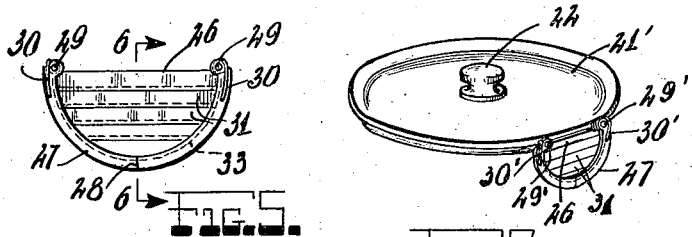
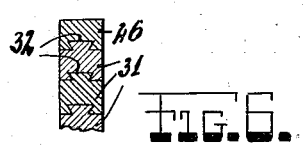
INVENTOR
Joseph Radolsky
BY
ATTORNEY Patented Oct. 4, 1927.

1,644,353

UNITED STATES PATENT OFFICE.

JOSEPH RADOLSKY, OF NEW YORK, N. Y.

SAFETY BOILING VESSEL.

Application filed February 23, 1927. Serial No. 170,137.

This invention relates generally to cooking devices and has more particular reference to a novel type of safety boiling vessel.

The invention has for an object the provision of an improved safety boiling vessel which will act efficiently, and which can be manufactured and sold at a reasonable cost.

For further comprehension of the invention and of the objects and advantages thereof, reference will be had to the following description and accompanying drawings, and to the appended claims in which the various novel features of the invention are more particularly set forth.

Referring to the drawing forming a material part of this disclosure:—

Fig. 1 is a perspective view of a device constructed according to this invention.

Fig. 2 is a vertical sectional view taken on the line 2—2 of Fig. 1.

Fig. 3 is a vertical sectional view of a modified form of spout, this view being taken on a modified device, not shown on the drawing, at a point similar to the line 3—3 of Fig. 1.

Fig. 4 is a plan view of one of the vessels used in the instant invention, and having its cover removed, and being of modified form.

Fig. 5 is a front view of a throttling means used in the device illustrated in Fig. 4.

Fig. 6 is a fragmentary vertical sectional view taken on the line 6—6 of Fig. 5.

Fig. 7 is a perspective view of the cover for the invention device with the throttling means attached thereto.

The reference numeral 10 indicates generally the top of a heating device such as a stove, while 11 indicates the top of a non-heated portion of the heating device. Resting on 10 is a vessel 12 preferably formed of drawn metal to have rounded bottom edges 13, the bottom and sides of the vessel being formed of one piece so as not to expose joints to the heating device. The vessel 12 has a semi-circular cut-out 14 at its top edge, and a semi-circular spout 15 is attached at this portion by a flange 16 integral to the spout and riveted, as at 17 to the vessel. At another portion of the vessel a handle 18 with an end aperture 19, is attached as by rivets 20. A cover 21 with a central handle 22 fits on the vessel 12, and the cover is formed with an upturned edge 23 so as to be capable of snugly fitting the vessel.

The spout 15 need not necessarily be limited as semi-circular in cross-section. It may be any shape, as for example V shaped, as shown in Fig. 3. Resting on 11 is a vessel 24 of such height as to be capable of standing beneath spout 15.

In the modification of the invention shown in Figs. 4, 5 and 6, the flange 16' of the spout 15 is bent to form a groove 25 between the spout 15 and the side of the vessel 12. Resting within the groove 25 is a throttling means formed by a top member 26 having semi-circular side member 27 split at the center as at 28, and hingedly connected at the top end to the top member 26 as indicated by hinges 29. Coaxial with the hinges 29 are springs 30 acting between the top member 26 and the side member, normally urging the parts of the side member 27 so that the sides of the split 28 engage each other. Blocking members 31 engage each other and the top member 26 by means of dovetailed tongues and grooves 32. Formed on the inner side of the side member 27 is a groove 33 into which the ends of the blocking members 31 engage.

Fig. 7 illustrates a modification of the invention, in which cover 21' has the side members 27 hingedly attached as at 29', and springs 30' act between the cover and the side member, normally urging the parts of the side member that the sides of the split 28 engage each other.

In the operation of the device, milk, or any other similar liquid, is placed in vessel 12, and the heating device 10 is set into action. When the milk boils and starts running, instead of lifting the cover 21, overflowing from the sides of vessel 12, soiling the member 10, and attempting to extinguish the fire of member 10, it merely flows thru 14, and the spout 15 into vessel 24. Very obviously, vessel 24 is an essential element in the combination, for if not for this vessel, the ruining character of the running milk will not be arrested. The vessel 12 may be carried by handle 18, and when not in use may be hung up in a closet, making use of aperture 19.

Different liquids have different running speeds, and it may be desirous of changing the size of opening 14. This may be accomplished by the use of the throttling means. The parts of side member 27 may be swung about hinges 29 against the restraining action of spring 30, and many of the blocking members 31 may be removed by sliding so that the dovetailed tongues and grooves 32 disengage. Thereafter the side members are allowed to assume normal positions, and the throttling means is engaged in groove 25.

While I have above described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new and desire to secure by United States Letters Patent is:—

1. A safety boiling vessel, comprising a vessel formed with a cutout at its upper edge, a spout comprising a flange having an offset edge portion adapted to provide a recess between the inner portion of said flange and the side of said vessel positioned at the cutout, rivets disposed through the offset portion of said flange and through the sides of said vessel for attaching the spout thereto, a handle secured to another portion of the vessel, a cover with a central handle, and formed with upturned edges capable of snugly fitting on the said vessel, and means disposed in the recess between said flange and the side of said vessel for substantially changing the size of the cutout of the latter.

2. In a safety boiling vessel, a vessel formed with a cutout, a spout aligned with the cutout, a flange integral with the spout, the flange being bent to present a groove between the spout and vessel, means for fastening the flange to the vessel, a top member, a split side member hingedly connected to the top member, the side member being engaged in the said groove, springs normally urging the parts of the side member so that the ends of the split engage each other, and blocking members secured to each other and to the top member by means of dove-tailed tongues and grooves, the side member being formed with a groove engaged by the ends of the blocking members.

3. A cover for a vessel formed with a cutout, a spout aligned therewith, and a flange integral with the spout, and bent to present a groove between the spout and vessel, comprising a cover body, a split side member hingedly connected therewith, the side member being engageable in the said groove, springs normally urging the parts of the side member so that the ends of the split engage each other, and blocking members secured to each other and to a top member by means of dove-tailed tongues and grooves, the side member being formed with a groove engaged by the ends of the blocking members.

4. A safety boiling vessel of the class disclosed comprising a cylindrical container having a cutout in the upper edge thereof, a spout mounted on the side of said container in registration with the cutout thereof comprising a flange having an offset outer portion shaped to conform with the side of said vessel and adapted to provide a recess between the latter and the inner portion of said flange, a cover adapted to be disposed over the open end of said vessel, and a weir secured to the edge of said cover adapted to be disposed in said recess for predetermining the level of the liquid in said container.

5. A safety boiling vessel of the class disclosed comprising a cylindrical container having a cutout in the upper edge thereof, a spout mounted on the side of said container in registration with the cutout thereof comprising a flange having an offset outer portion shaped to conform with the side of said vessel and adapted to provide a recess between the latter and the inner portion of said flange, a cover adapted to be disposed over the open end of said vessel, and a gate member pivotally attached to the edge of said cover adapted to be depended into said recess comprising removable sections for varying the size of the opening between said spout and said container.

In testimony whereof I have affixed my signature.

JOSEPH RADOLSKY.